Sept. 13, 1927.  1,642,179
C. H. SCHURR
METHOD FOR FINISHING GEAR TEETH
Filed July 21, 1926  4 Sheets-Sheet 1
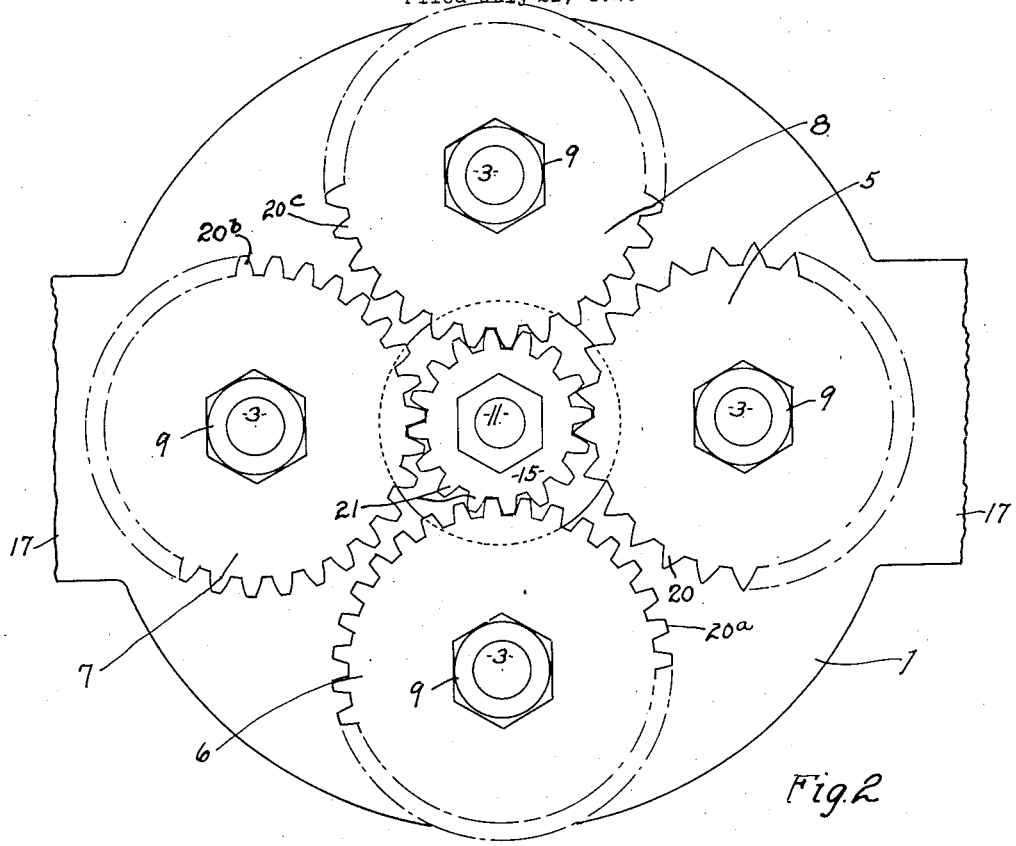
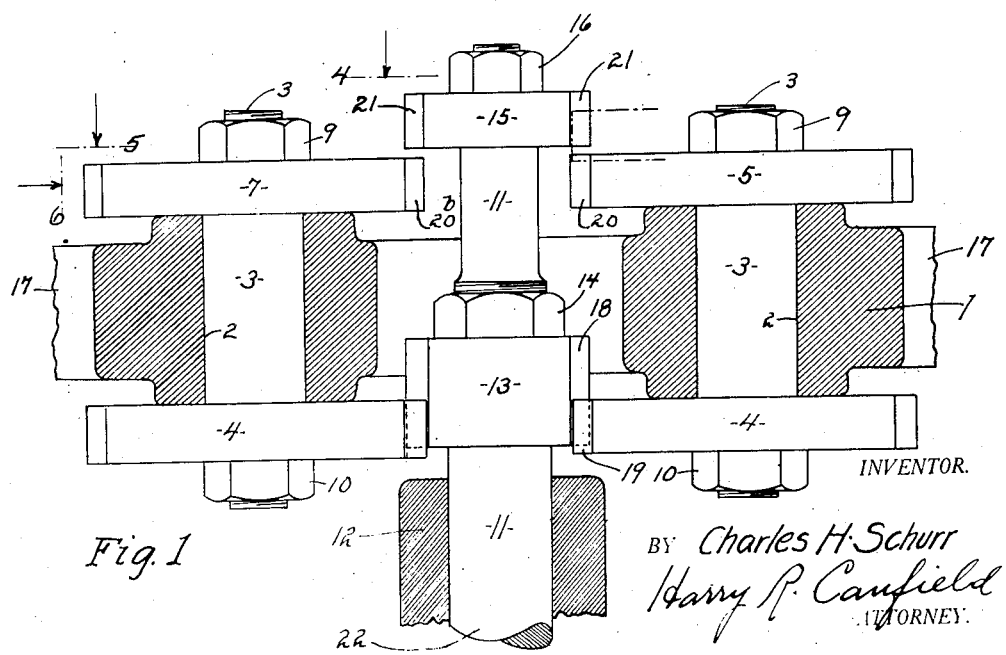
INVENTOR.
BY Charles H. Schurr
Harry R. Canfield
ATTORNEY.

INVENTOR.
Charles H. Schurr
BY Harry P. Canfield
ATTORNEY.

Sept. 13, 1927.  1,642,179
C. H. SCHURR
METHOD FOR FINISHING GEAR TEETH
Filed July 21, 1926   4 Sheets-Sheet 4

INVENTOR.
Charles H. Schurr
BY
Harry R. Canfield
ATTORNEY.

Patented Sept. 13, 1927.

1,642,179

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

METHOD FOR FINISHING GEAR TEETH.

Application filed July 21, 1926. Serial No. 123,966.

This invention relates to methods for finishing gear teeth and the like, and particularly the working faces thereof.

In the practice of the art of gear making, when it is desired to produce gear teeth having a high degree of accuracy of profile and uniformly spaced around the gear, it is common practice to "rough out" the teeth on the gear blank, as for example, by a hobbing machine; and then to partially finish them by a second machine operation, as for example, by a second hobbing machine; and then to finally true up and finish the teeth by some more refined operation such as grinding. Each of these operations consumes considerable production time and requires expensive and complicated production machinery.

Furthermore, while grinding has been hitherto the best known method of finally finishing gear teeth, and produces a result which is satisfactory in many respects, the speed of production by grinding is limited and it requires elaborate and expensive production machinery; and before grinding can be performed satisfactorily, at least the two machine operations above mentioned must be performed on the teeth.

It is therefore an object of this invention to provide a new and improved method of finishing gear teeth to bring them accurately to the required profile, and to true them up accurately as to spacing around the gear and as to concentricity; and which method is rapid and requires relatively simple machinery; and which method may be employed directly upon gear teeth which have been roughed out by only a single operation.

Another object is, to provide such an improved method which, while finishing the teeth, also gives to the metal composing their working faces, improved physical properties which add to the wearing qualities of the gear.

With these objects in view, as well as others which will be apparent to those who practice this art, the invention in one aspect comprises, among other things, the employing of a master gear of accurate tooth profile and tooth spacing and hardened and fashioned for use as a tool; and of meshing its teeth with the teeth of the gear to be worked, the teeth of the latter having been roughed out slightly larger in cross section than the required finished size; and of rotating the gear and tool, independently of their meshed relation, by external means; and of feeding the gear and tool relatively to each other in the longitudinal direction of the teeth; and of rigidly holding their axes of rotation in fixed spaced relation to each other.

In another aspect, the invention comprises among other things, the working of the roughed out tooth faces of a gear by a tool in a manner to so displace, redistribute, move and smooth out the metal composing the surface of each face, that some metal is displaced at all portions of the face surface; and that, if the faces are inaccurate as to profile, more metal is displaced at some portions of the face surface than at other portions to true up the profile of the tooth; and that, if the teeth or their faces are inaccurately spaced or are not concentric, some faces are worked as a whole more than others to cause the circular pitch or tooth spacing to become accurate, and the teeth to become concentric; and that this working action is carried on progressively from end to end of the teeth; and that the surplus metal is shifted or moved to a point or points beyond, or out of, the working faces of the teeth; and so that the whole surface of each working face is compacted, condensed or/and hardened.

In this disclosure of my invention and in the claims, the verb "to finish" or its derivatives such as "finishing" is intended to be used with the following meaning: To rework the tooth faces of a gear, made by some preceding operation, leaving the teeth faces accurate as to profile, spacing and concentricity and with a smooth and dense surface.

Likewise in this disclosure, the verb "to mesh" as applied to gears or the teeth thereof, is to be defined as meaning to mutually engage the teeth of two gears in such manner that the teeth of each gear enter the tooth spaces of the other gear, whether rotating or at rest, and whether the engagement is on all or a part of the longitudinal length of the tooth or teeth.

In the drawings Fig. 1 is a side view of one form of an apparatus for carrying out my invention, the same being diagrammatic in some respects, some of the parts being in section, and some of the parts back of the sectional plane being omitted for clearness.

Fig. 2 is a top plan view of the apparatus of Fig. 1.

Figure 8:
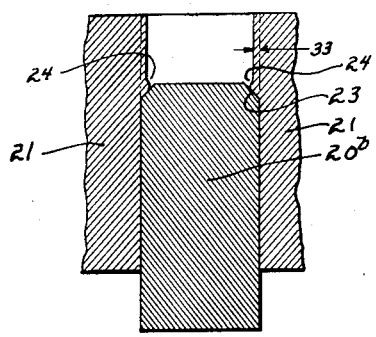
Fig. 8 is a sectional view taken on the plane 8 of Fig. 4.
Figure 5:
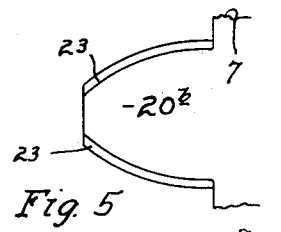
Fig. 5 is a view taken from the plane 5 of Fig. 1, and drawn to a larger scale.
Figure 9:
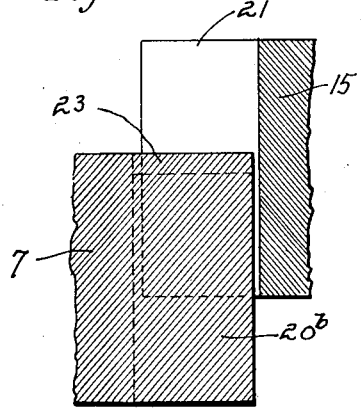
Fig. 9 is a sectional view taken on the plane 9 of Fig. 4.
Figure 6:
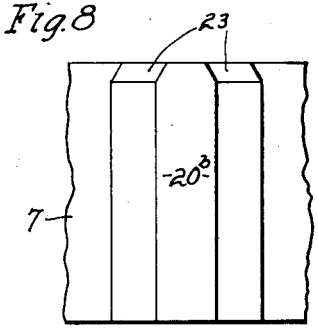
Fig. 6 is a view taken from the plane 6 of Fig. 1, and drawn to a larger scale.
Figure 7:
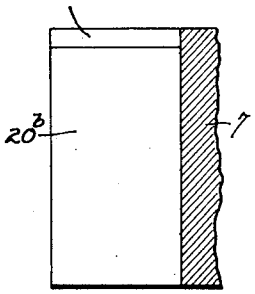
Fig. 7 is a view taken from the plane 7 of Fig. 5.

Figs. 13 to 18 inclusive are sectional views showing modifications of the working portion of a tool which I employ, and which tool is also similarly shown in Fig. 8.

Figs. 19 to 22 inclusive are diagrammatic views illustrative of modified applications of my invention.

Referring to Figs. 1 and 2, I show at 1 an annular frame having bores 2 in which are rotatably mounted tool spindles 3, having on the lower ends thereof gears 4, and on the upper ends thereof tools 5, 6, 7 and 8 to be more fully described later. The gears and tools are rigidly secured upon the spindles 3 by upper nuts 9 and lower nuts 10.

A central work spindle 11 is rotatably mounted in a bearing 12, and carries a driving gear 13 rigidly secured thereon by a nut 14, and adapted to mesh with and drive the gears 4; and on its upper end, the spindle 11 carries a gear-to-be worked, or work gear, 15, rigidly secured thereon by a nut 16.

Means not shown is intended to be applied to the annular frame 1 as at the broken off portions 17 thereof to move the frame 1 upwardly and downwardly (as viewed in Fig. 1), so that the gears 4 and tools 5, 6, 7 and 8 on the tool spindles 3 will be given axial movement relatively to the gear 13 and work gear 15 on the work spindle 11. If preferred, the frame 1 may be held stationary and the work spindle 11 moved upwardly and downwardly (as viewed in Fig. 1) in the direction of its axis. The driving gear 13 and driven gears 4 are accurately made gears and have accurately made teeth; and the teeth 18 of the gear 13 are made relatively long, in the axial direction, so that when the gears 4 and 13 are moved axially relatively to each other, the teeth 19 of the gears 4 remain always in mesh with the teeth 18 of the gear 13. The tools 5, 6, 7 and 8, to be more fully described, have teeth 20, 20ª, 20ᵇ and 20ᶜ respectively which may be meshed with the teeth 21 of the work gear 15, or may be drawn entirely out of mesh therewith by the relative axial movement above referred to.

Each of the tools 5, 6, 7 and 8 is so secured on its tool spindle 3, and the work gear 15 is so secured on the work spindle 11 and in such rotated positions about their respective axes that all of the tools will mesh with the work gear; the gears 4 and 13, as above stated, being at the same time always in mesh.

Means not shown is provided for applying power at 22 to the work spindle 11 to rotate it; and as will now be understood, this will cause the gear 13 to drive the gears 4, and turn the tool spindles 3 and the tools 5, 6, 7 and 8, in unison therewith, and will also cause the work gear 15 to turn so that its tooth spaces will mesh with the teeth of the tools.

The tools and the work gear preferably do not drive each other but are preferably fixed upon their respective spindles at such rotated positions about their respective axes that when the accurate, meshed gears 4 and 13 (which are also secured to the same spindles) rotate, the tools and work gear are caused to rotate with the same relative movement as the gears 4 and 13.

For purposes to be described, the annular frame 1 is rigid in itself, and is rigidly supported at 17 against lateral movement; and if desired, the bearing 12 may be supported in a rigid manner against lateral movement so that the axes of the work spindle 11 and the tool spindles 3 are maintained at fixed radial distances from each other.

The tools 5, 6, 7 and 8 which will now be described, are in substance and effect accurately made master gears, having accurate tooth profiles and accurate tooth spacing. The upper ends (as viewed in Fig. 1) of the tool teeth are preferably chamfered along the edges formed by the intersection of the tooth faces and the gear face, as clearly shown at 23 in Figs. 4 to 9 inclusive. To simplify the drawing, the chamfer 23 is omitted from Figs. 1, 2 and 3 as are also some of the teeth 20, 20ª, 20ᵇ and 20ᶜ of Fig. 2. The tools are made harder than the metal of the gears to be worked.

Figure 4:
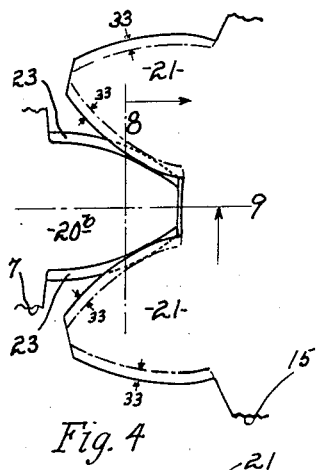
Fig. 4 is a view taken from the plane 4 of Fig. 1, and drawn to a larger scale.

The operation of my invention as thus far described, is as follows. With the parts in the positions shown in Figs. 1 and 2, the spindles are rotated, as above described, and preferably at a high rate of speed, and while so rotating, the work spindle 11 and tool spindles 3 are moved axially relatively to each other, as for example, by moving the annular frame 1 upwardly (as viewed in Fig. 1). The tool teeth 20, 20$^a$, 20$^b$ and 20$^c$ will thus be caused to enter the roughed out tooth spaces of the work gear 15, the chamfered portions 23 of the tool teeth entering the tooth spaces first. The accurate teeth of the tools 5, 6, 7 and 8 are of the correct size to properly mesh (as with conjugate gear teeth) with the teeth 21 of the gear 15 after they will have been finished; but inasmuch as the teeth 21 have only been roughed out, they are somewhat larger than their required finished size, and therefore the tooth spaces are correspondingly smaller. Therefore as the tools 5, 6, 7 and 8 advance axially into the tooth spaces of the work gear 15, the teeth of the tools must displace and redistribute or move a layer of the metal composing the surfaces of the teeth 21. The movement of the tool teeth 20, 20$^a$, 20$^b$ and 20$^c$ upon the faces of the work gear teeth 21 is combined of movement in generally radial directions, due to the rotation of the tools and work gear, and of movement in the axial direction along the tooth faces, due to feeding the tool teeth 20, 20$^a$, 20$^b$ and 20$^c$ axially into the tooth spaces of the work gear 15. Because of these movements, the surface metal or a thin layer thereof is displaced or moved radially inwardly and outwardly, and longitudinally, on the faces of the teeth 21, and is redistributed thereon. The tool teeth 20, 20$^a$, 20$^b$ and 20$^c$, being accurate as to profile and spacing, and concentric, the faces which it leaves on the teeth as it finally passes over their surfaces will be accurate as to profile, tooth spacing and concentricity. And if the tool teeth have been given smooth face surfaces, the face surfaces of the gear teeth 21 will be correspondingly smooth. Also, due to the general wedge character of the chamfer 23 of the tool teeth, some of the metal composing the roughed out surface of the gear teeth 21 will not be moved to any great extent, but will be displaced and redistributed by being compressed or ironed into, or compacted into the face surface of the gear tooth, giving to the face surface an increased hardness, density, etc. The layer of metal worked by the tool is illustrated in Figs. 4 and 8 at 33.

Figures 11, 12:
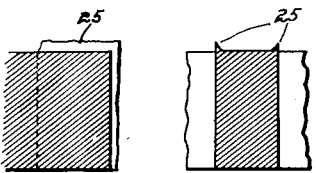
Fig. 11 is a sectional view taken on the plane 11 of Fig. 10.
Fig. 12 is a sectional view taken on the plane 12 of Fig. 10.
Figure 10:
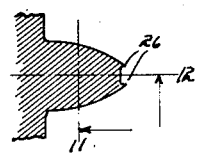
Fig. 10 is a sectional view of a gear tooth finished by my invention and showing a detail thereof.

That portion of the metal forming the surface of the roughed out gear teeth 21 which is not redistributed on the surface of the teeth either by increasing the surface density or by correcting inaccuracies of profile, or in correcting inaccuracies of spacing or concentricity, is moved along ahead of the tool tooth in a wave, as clearly shown for the tooth 20$^b$ at 24 in Fig. 8. When the tool tooth has passed entirely through the tooth space of the gear 15, this surplus metal will be piled up on the gear tooth, but entirely out of the tooth space and off of the tooth face. Some of it may appear on the face of the gear in ridges, as shown at 25 in Figs. 11 and 12, and some of it appear in ridges along the outer ends of the teeth, as shown at 26 in Fig. 10. It will be understood that in the drawing, the wave of metal 24 and the ridges of metal 25 and 26 are shown greatly magnified for illustrative purposes, the actual dimensions being in the order of a few thousandths or ten thousandths of an inch. If desired, these small ridges may be subsequently removed by any cheap or rapid process, or may be left on the gear.

The rate of feeding the work gear 15 and tools 5, 6, 7 and 8 axially relatively to each other may be varied to suit conditions as will be understood. Under ordinary or average conditions, the feed may be of the order of five one thousandths of an inch per revolution of the work gear. The feed may be continuous during the rotation of the gear and tools, and in such case the general path of each tool with respect to the work gear is a helix, the relative movement being simultaneously around the gear and axially thereof.

Figures 13, 14:
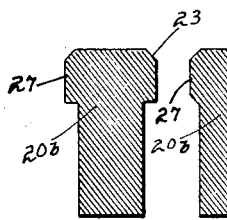
Figures 15, 16, 17, 18:
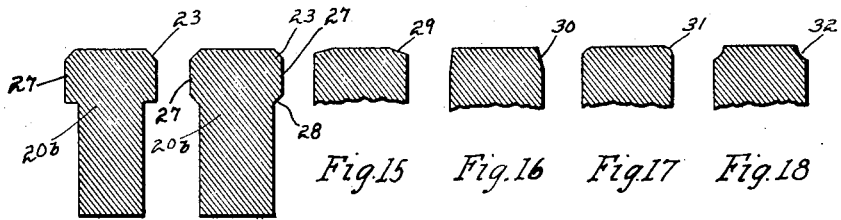
Figure 19:
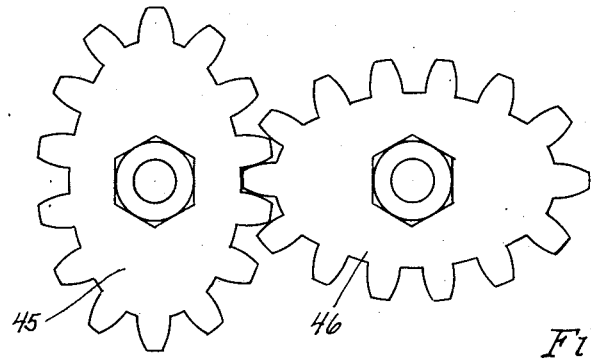
Figure 20:
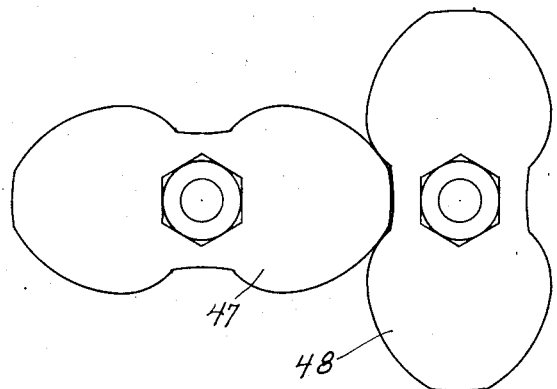
Figure 21:
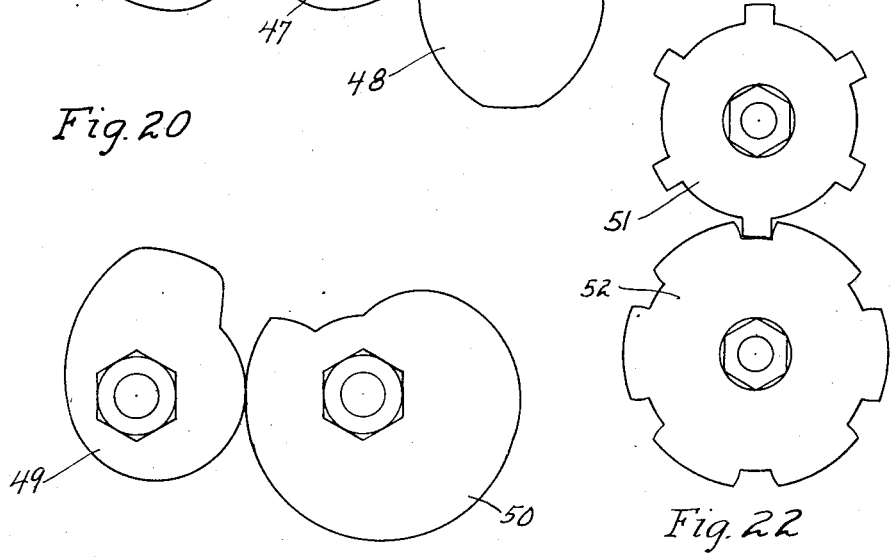
Figure 22:
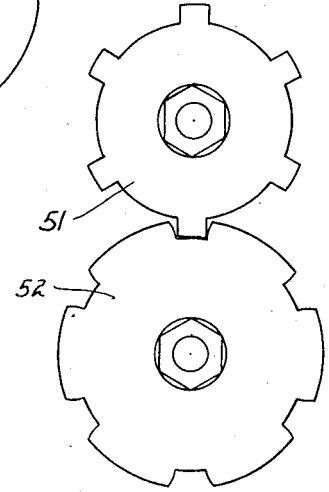

In Figs. 13 to 18 inclusive, I have shown tool teeth for example, a tooth 20$^b$ in which the shape and direction or angle of the chamfer 23 is modified in various ways, all or any of which may be employed. In Fig. 13 the chamfer is similar to that above described, but the tooth 20$^b$ is accurately made for only a portion of its length, as shown at 27. In Fig. 14, the tooth is chamfered at 23, as above described, and also at 28, and has the accurate portion 27; and the tool if made in this way may be passed through the gear teeth 21 either upwardly or downwardly, or in both directions successively, and if desired repeatedly, as will be understood. In Fig. 15, the chamfer is flatter, as at 29. In Fig. 16, the chamfer is steeper as at 30. In Fig. 17, the chamfer is curved convexly as at 31. In Fig. 18, the chamfer is curved concavely as at 32. The modifications of Figs. 13 to 18 inclusive may of course be applied to the teeth 20, 20$^a$, 20$^c$, as well as to 20$^b$.

Figure 3:
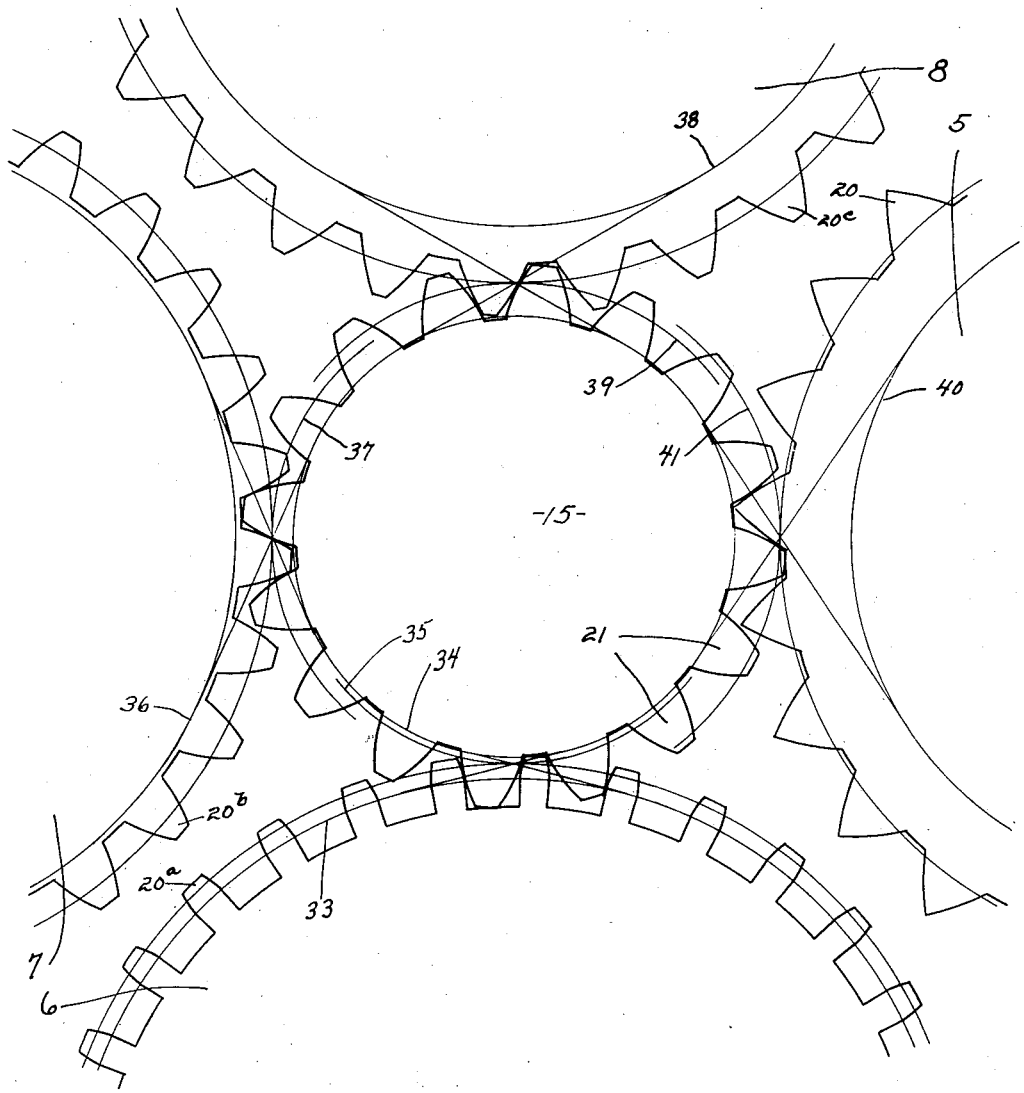
Fig. 3 is a view similar to Fig. 2 showing some of the parts thereof drawn to a larger scale, and showing certain gear tooth properties of some of the parts employed.

As will be observed in Figs. 2 and 3, the teeth of the tools 5, 6, 7 and 8 are of different profiles on the respective tools. The purpose of this will now be described. As is well known in the art, when two meshing gears are rotated, the engaging teeth move upon each other with a contact which is partly rolling and partly sliding. At the common pitch circle the teeth roll upon each other, and outside or inside of the pitch circle they slide upon each other; the farther from the pitch circle, the greater the relative sliding movement between two adjacent and engaging teeth. Because of this, in the employment of my invention, the action of a tool tooth such as the tooth 20 on the face of a tooth 21 of the work gear 15 is slightly less effective at the pitch circle (or pitch cylinder) of the gear teeth than inside or outside thereof. To compensate for this, I may, if desired, employ a plurality of tools, as for example four as above described and illustrated. In this case, and as shown in Fig. 3, the teeth of each tool 5, 6, 7 and 8 are made with a pressure angle different from that of the teeth of the other tools, so that the pitch circle of the work gear 15 is at a different radius for each of the tools 5, 6, 7 and 8. By this means, the effectiveness of the tool teeth is made substantially uniform over the whole face of the gear tooth, and produces faces thereon of a high degree of accuracy. In this connection, by reference to Fig. 3, it will be noted that the tool teeth 20$^a$ of the tool 6 are developed from the base circle 33, which has a relatively large radius, and which, in connection with the base circle 34 of the gear 15 determines the pitch circle 35, of relatively small radius for the gear 15; similarly with respect to the tools 7, 8 and 5, the teeth 20$^b$, 20$^c$ and 20 thereof are developed with respect to base circles 36, 38, and 40, each of successively smaller radius, and which, in connection with the base circle 34 of the gear 15, determine respectively for the gear 15, pitch circles 37, 39 and 41 of successively larger radius. Preferably each of the driven gears 4 is of the same tooth profile, diameter, etc. as the tool on the other end of the spindle, which it in turn drives.

Instead of employing tools 6, 7, 8 and 5 of approximately the same diameter and having successively smaller base circles to work the gear 15 on successively larger pitch circles, as illustrated in Fig. 3, I may employ tools of successively larger diameter, but all having base circles of the same diameter. This will have the same effect as above described, namely, that of causing each tool to work the gear 15 on a different pitch circle. Still other ways of arriving at this same result will be apparent to those skilled in this art.

The necessity of maintaining the axes of the work spindle 11 and the tool spindles 3 in fixed relation to each other, and of driving the work gear 15 and tools 5, 6, 7 and 8 by external means independent of their meshed relation will now be apparent. Merely meshing the tools 5, 6, 7 and 8 with the work gear 15, and rotating them and feeding them axially might redistribute the metal of the gear teeth faces, but it would not correct inaccuracies of their profiles, spacing and concentricity.

Furthermore, while it is obviously important that the tools 5, 6, 7 and 8 be accurate (as to pitch circle, spacing and concentricity), it is also important that the driving and driven gears 13 and 4, or, in other words, the control gears controlling the relative movements of the tools and work gear 15 be accurate. The degree of accuracy of the finished work gear 15 will therefore depend upon both (a) accuracy of the tool and (b) uniformity of the rolling movement of the pitch circle of the work gear and of the tool, one on the other, which in turn is dependent upon the accuracy of the control gears. I have found that the control gears and the tools for this purpose produce more accurate work gears when made by a gear making machine in which the gear tooth profiles are generated; and that, of this type of gear making machine, the generating grinder will produce tools and control gears capable of producing the most accurate work gears; and that control gears and tools which are first cut and then hardened before being ground are, of all generated ground gears, capable of producing the most accurate work gears. I have therefore found that the work gear 15 can be corrected to the highest degree of accuracy by employing cut, hardened, generated-ground gears 4 and 13 and tools, 5, 6, 7 and 8.

While I prefer to employ tools having teeth developed according to the involute system, this is not essential. It will be understood that any desired profile on the work gear teeth 21 may be produced by employing a corresponding profile on the tool teeth.

Shapes other than circular, and mating parts other than gears, and having faces or surfaces to be finished other than teeth, may be worked or finished by my invention. To illustrate this, I have shown in Fig 19 an elliptical gear 45, the teeth of which may be finished by employing a corresponding elliptical master gear tool 46. Again, in Fig. 20, I have shown diagrammatically the two rotating and mating parts of a positive displacement rotary pump of well known type. Both parts are alike, and either of them such as the part 47 may be finished by a similar tool corresponding in profile to the other part, such as 48. Again, in Fig. 21, I show diagrammatically a machine part 49 which may be used as a cam, and the working face thereof may be accurately finished according to my invention by rotating it with a tool, such as 50, having a corresponding profile. Again, in Fig. 22, I show diagrammatically a spline shaft 51, and the cylindrical and spline surfaces thereof may be finished by rotating it with a tool such as 52. Thus it will be apparent that my invention is not limited to gears, and Figs. 19 to 22 are only a few of the many possible applications of my invention.

The tools 5, 6, 7 and 8 may be fed into the gear 21 simultaneously or singly and successively, or simultaneously but one ahead of another.

While I have shown my invention as applied to the production of spur gears, it is not limited to this type of gear, but may be employed in the production of helical and other types of gears. It will also be understood that the mechanism shown in Figs. 1 and 2 is merely illustrative of my invention, and that my invention may be embodied in other and various forms.

While I have shown a plurality of tools to finish gears to a very high degree of accuracy, my invention may be carried out with a single tool such, for instance, as the tool 7, to finish gears to a degree of accuracy satisfactory for some purposes.

In the foregoing I have described the apparatus of Figs. 1 and 2 as with the bearing 12 and annular frame 1 stationary in space and with the work spindle 11 and spindles 3 rotating on their respective axes. As a result, each of the tools 5, 6, 7 and 8 rolls in mesh with the work gear 15. This same relative rolling movement between the tools and work gear would result if the work spindle 11 were locked in the bearing 12 against rotation and the annular frame 1 were rotated; each of the tools 5, 6, 7 and 8 would then roll around the work gear 15. As another example, if one of the tools, for instance the tool 5, and the spindle 3 and master gear 4 associated therewith, were all fixed in space against rotation, and if power were applied to rotate the work spindle 11, then the work spindle and each of the other tools would bodily rotate around the axis of the tool 5. Other arrangements will occur to those skilled in this art, and the described relative movement between the work gears and tools is to be interpreted as broadly including all such arrangements.

In feeding the work gear and the tools relatively to each other, I have described the work spindle 11 as fixed axially and the frame 1 as being moved axially. Exactly the same relative feeding movement would result if the annular frame 1 were held against axial movement and the work spindle 11 were moved axially. The feeding of the gear and tool relatively to each other, therefore, is to be interpreted as broadly including all arrangements in which the tool is fed into the work gear or the work gear is fed into the tool, or both.

I have shown and described the teeth of the tools as chamfered, and as stated, this is the preferred form, but the chamfer is not an essential feature because in some cases it can be dispensed with and therefore my invention is not to be limited in scope in this respect. When chamfer is not employed on the tool, the gear teeth may, if desired, be chamfered to admit the tool at the start of the finishing operation.

In the foregoing description, the action of the tool on the teeth of the work gear is described as displacing and redistributing the metal composing only a thin layer of the tooth face surfaces. It will be understood by all those skilled in the art of working metals that the more resistant the metal, the less will the described action be confined to the surface; the deeper will the action penetrate; and the thicker, so to speak, will be the said layer of the surface metal. In fact if the metal is very resistant, and if the chamfer is steep similar to that in Fig. 16, the wave 24 may not be present. In view of these and other variations of action due to variations of the physical characteristics of the metal of the work gear, and in view of the various degrees of chamfer or absence of chamfer which under various conditions it may be desirable and is possible to employ, my invention is not limited to any particular theory or law of action, or to any movement of or direction of displacement and distribution of the metal taking place during the finishing of the teeth faces according to my invention.

Also while my invention is primarily directed to re-distributing the metal of the tooth faces and is not directed to completely removing metal from the gear, it will be understood that in the practice of my invention some metal may incidentally be removed. For example, with hard cast iron gears some of the metal may crumble under the action of the chamfer and fall off; with steel gears, particles or flakes of metal may become loosened and detached; if oil be circulated to lubricate the action (as common practice would dictate) these particles may be sufficient in quantity to discolor the oil in time. Complete removal from the gear of some of the metal displaced may therefor occur in the practice of my invention, and any modification of my invention in which removal of metal occurs concurrently with redistribution of metal is not a departure from the spirit of my invention, and such modifications are embraced within its scope.

In this connection, furthermore, and in the claims, I have used the verb "to redistribute" and its derivatives to mean broadly, displacing gear tooth face material and relocating on the gear tooth face all or some of it.

However, the action of the tool on the gear teeth in displacing and redistributing the metal of the teeth faces in the manner and by the means hereinbefore disclosed may, for convenience as in the claims, be referred to as "ironing," or as an "ironing operation."

I claim:

1. The method of finishing the teeth of a work gear which includes meshing the work gear with a plurality of tools, each having working portions of gear tooth form, and rotating the tools and work gear relatively, and one of the tools rotating at a different work gear pitch circle from another.

2. The process of finishing the teeth of a work gear which includes redistributing the metal composing the surface of the teeth faces by a plurality of tool gears meshed with the work gear and the gear and tools rotated relatively, one of the tool gears mating with the work gear on a work gear pitch circle different from that of another tool.

3. The method of finishing the teeth of a gear which includes redistributing the metal composing the gear teeth faces by a tool of gear form, the tool and gear being rotated relatively in mesh with each other and moved relatively in the longitudinal direction of the gear teeth.

4. The method of finishing the teeth of a gear which includes redistributing the metal composing the gear teeth faces by a tool of gear form, the tool and gear being relatively rotated in mesh with each other by means external thereto and independently of their meshed relation, the redistribution of the metal being effected on only a portion of the longitudinal length of the gear teeth at any one time.

5. The method of finishing the teeth of a gear which includes redistributing the metal composing the gear teeth faces by a tool of gear form, the tool and gear being relatively rotated in mesh with each other by means external thereto and independently of their meshed relation, and moved relatively in the longitudinal direction of the gear teeth.

6. The method of finishing the teeth of a gear which includes redistributing the metal composing the gear teeth faces by a tool of gear form, the tool and gear being rotated relatively in mesh with each other on rotational axes maintained at a fixed distance from each other, and the gear and tool being moved relatively in the longitudinal direction of the gear teeth.

7. The method of finishing the teeth of a gear which includes redistributing the metal composing the gear teeth faces by a tool of gear form, the tool and gear being relatively rotated in mesh with each other by means external thereto and independently of their meshed relation, on axes of rotation maintained at a fixed distance from each other and moved relatively in the longitudinal direction of the gear teeth.

8. The method of finishing the teeth of a gear which includes redistributing the metal composing the gear teeth faces by a tool of gear form, the tool and gear being relatively rotated in mesh with each other and the redistribution of the metal being effected on only a portion of the longitudinal length of the gear teeth at any one time.

9. The method of finishing the teeth of a gear which includes redistributing the metal composing the gear teeth faces by a tool of gear form, the tool and gear being relatively rotated in mesh with each other and the redistribution of the metal being effected on only a portion of the longitudinal length of the gear teeth at any one time, and the redistribution of the metal beginning at one end of each tooth and being carried on progressively toward the other end.

10. The method of finishing the teeth of a gear which includes redistributing the metal composing the gear teeth faces by a tool of gear form, the tool and gear being relatively rotated in mesh with each other and moved relatively in the longitudinal direction of the gear teeth, the redistribution of the metal being effected on only a portion of the longitudinal length of the gear teeth at any one time.

11. The method of finishing the teeth of a gear which includes redistributing the metal composing the gear teeth faces by a tool of gear form, the tool and gear being relatively rotated in mesh with each other and moved relatively in the longitudinal direction of the gear teeth, the redistribution of the metal being effected on successive teeth around the gear and concurrently progressively from end to end longitudinally thereof on a generally helical working zone.

12. The method of finishing the teeth of a gear which includes redistributing the metal composing the gear teeth faces by a tool of gear form, the tool and gear being relatively rotated in mesh with each other by means external thereto and independently of their meshed relation, and moved relatively in the longitudinal direction of the gear teeth, the redistribution of the metal being effected on only a portion of the longitudinal length of the gear teeth at any one time.

13. The method of finishing the teeth of a gear which includes redistributing the metal composing the gear teeth faces by a tool of gear form, the tool and gear being relatively rotated in mesh with each other by means external thereto and independently of their meshed relation, and moved relatively in the longitudinal direction of the gear teeth, the redistribution of the metal being effected on successive teeth around the gear and concurrently progressively from end to end longitudinally thereof on a generally helical working zone.

14. The method of finishing a work gear which includes relatively rotating the work gear in mesh with a plurality of tools of gear form, one of the tools meshing with the work gear on a work gear pitch circle different from that on which another tool meshes with it.

15. The method of finishing a work gear which includes relatively rotating the work gear in mesh with a plurality of tools of gear form, one of the tools meshing with the work gear on a work gear pitch circle different from that on which another tool meshes with it and moving the gear and tools relatively in the longitudinal direction of the gear teeth.

16. The method of finishing a work gear which includes relatively rotating the work gear in mesh with a plurality of tools of gear form, one of the tools meshing with the work gear on a work gear pitch circle different from that on which another tool meshes with it, the gear and tools being rotated by means external thereto and independently of their meshed relation.

17. The method of finishing a work gear which includes relatively rotating the work gear in mesh with a plurality of tools of gear form, one of the tools meshing with the work gear on a work gear pitch circle different from that on which another tool meshes with it, the gear and tools being moved relatively in the longitudinal direction of the gear teeth and rotated by means external thereto and independently of their meshed relation.

18. The method of finishing the teeth of a work gear which includes redistributing the metal composing the surfaces of the work gear teeth faces by a plurality of tools of gear form, the work gear and tools being relatively rotated in meshed relation, and one of the tools meshing with the work gear on a work gear pitch circle different from that on which another tool meshes with it.

19. The method of finishing a gear which includes meshing it with a tool of gear form the teeth faces of which in meshing contact terminate longitudinally in working edges, relatively rotating the meshed gear and tool, and giving them relative movement in the longitudinal direction of the gear teeth to effect an ironing operation over the longitudinal length of the gear teeth faces by said working edges of the tool teeth.

20. The method of finishing a gear which includes meshing it with a tool of gear form, the teeth faces of which in meshing contact terminate longitudinally in working edges, relatively rotating the meshed gear and tool and giving them relative movement in the longitudinal direction of the gear teeth to effect an ironing operation over the whole longitudinal length of the gear teeth faces but on only a portion thereof at any one time, by the said working edges of the tool teeth.

21. The method of finishing a gear which includes meshing it with a tool of gear form, the teeth faces of which in meshing contact terminate longitudinally in working edges, relatively rotating the meshed gear and tool, and giving them relative movement in the longitudinal direction of the gear teeth to effect an ironing operation on the gear teeth faces by said working edges of the tool teeth operating thereon on a generally helical zone around the gear.

22. The method of finishing a gear which includes meshing it with a tool of gear form, the teeth faces of which in meshing contact terminate longitudinally in working edges, relatively rotating the meshed gear and tool, and giving them relative movement in the longitudinal direction of the gear teeth to effect an ironing operation on the gear teeth faces by said working edges of the tool teeth.

23. The method of finishing a gear which includes meshing it with a tool of gear form, the teeth faces of which in meshing contact terminate longitudinally in working edges, and in giving relative movement to the gear and tool in the longitudinal direction of the gear teeth to effect an ironing operation on the gear teeth faces by said working edges of the tool teeth.

24. The method of finishing a gear which includes meshing it with a tool of gear form, the teeth faces of which in meshing contact terminate longitudinally in chamfered working edges, relatively rotating the meshed gear and tool, and giving them relative movement in the longitudinal direction of the gear teeth to effect an ironing operation over the longitudinal length of the gear teeth faces by said chamfered working edges of the tool teeth.

25. The method of finishing a gear which includes meshing it with a tool of gear form, the teeth faces of which in meshing contact terminate longitudinally in chamfered working edges, relatively rotating the meshed gear and tool, and giving them relative movement in the longitudinal direction of the gear teeth to effect an ironing operation over the whole longitudinal length of the gear teeth faces but on only a portion thereof at any one time, by the said chamfered working edges of the tool teeth.

26. The method of finishing a gear which includes meshing it with a tool of gear form, the teeth faces of which in meshing contact terminate longitudinally in chamfered working edges, relatively rotating the meshed gear and tool, and giving them relative movement in the longitudinal direction of the gear teeth to effect an ironing operation on the gear teeth faces by said chamfered working edges of the tool teeth operating thereon on a generally helical zone around the gear.

27. The method of finishing a gear which includes meshing it with a tool of gear form, the teeth faces of which in meshing contact terminate longitudinally in chamfered working edges, relatively rotating the meshed gear and tool, and giving them relative movement in the longitudinal direction of the gear teeth to effect an ironing operation on the gear teeth faces by said chamfered working edges of the tool teeth.

28. The method of finishing a gear which includes meshing it with a tool of gear form, the teeth faces of which in meshing contact terminate longitudinally in chamfered working edges, and in giving relative movement to the gear and tool in the longitudinal direction of the gear teeth to effect an ironing operation on the gear teeth faces by said chamfered working edges of the tool teeth.

29. The method of finishing a work gear which includes relatively rotating the work gear in mesh with a plurality of tools of gear form, one of the tools meshing with the work gear on a work gear pitch circle different from that on which another tool meshes with it, and with both tools meshing with the work gear on the same work gear profile curves.

30. The method of finishing a work gear which includes relatively rotating the work gear in mesh with a plurality of tools of gear form, one of the tools meshing with the work gear on a work gear pitch circle different from that on which another tool meshes with it, and with both tools meshing with the work gear on the same work gear involutes.

31. The method of finishing the profile of a roatable machine member, which said profile comprises convex and concave face portions, which includes redistributing the metal composing the said faces by a tool having a profile comprising corresponding working portions respectively concave and convex, the tool and machine member being rotated relatively and with their corresponding concave and convex portions in mesh with each other, and the tool and machine member being moved relatively in the direction of the rotational axis of the machine member.

32. The method of finishing the profile of a rotatable machine member, which said profile comprises convex and concave face portions, which includes redistributing the metal composing the said faces by a tool having a profile comprising corresponding working portions respectively concave and convex, the tool and machine member being rotated relatively and with their corresponding concave and convex portions in mesh with each other, and the tool and machine member being moved relatively in the direction of the rotational axis of the machine member, and the redistribution of the metal being effected around the machine member and progressively over it in the direction of its rotational axis on a generally helical zone.

33. The method of finishing the profile of a rotatable machine member, which said profile comprises convex and concave face portions, which includes redistributing the metal composing the said faces by a tool having a profile comprising corresponding working portions respectively concave and convex, the tool and machine member being rotated relatively and with their corresponding concave and convex portions in mesh with each other, and the tool and machine member being moved relatively in the direction of the rotational axis of the machine member, and the redistribution of the metal being effected by an ironing operation, around the machine member and progressively over it in the direction of its rotational axis on a generally helical zone.

In testimony whereof, I have hereunto signed my name.

CHARLES H. SCHURR.